(12) United States Patent
Yamamoto et al.

(10) Patent No.: US 12,044,627 B2
(45) Date of Patent: Jul. 23, 2024

(54) DEFECT INSPECTION DEVICE AND DEFECT INSPECTION METHOD

(71) Applicant: Hitachi High-Tech Corporation, Tokyo (JP)

(72) Inventors: Masaya Yamamoto, Tokyo (JP); Toshifumi Honda, Tokyo (JP); Masami Makuuchi, Tokyo (JP); Nobuhiro Obara, Tokyo (JP); Shunichi Matsumoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 348 days.

(21) Appl. No.: 17/597,319

(22) PCT Filed: Jul. 24, 2019

(86) PCT No.: PCT/JP2019/029076
§ 371 (c)(1),
(2) Date: Jan. 3, 2022

(87) PCT Pub. No.: WO2021/014623
PCT Pub. Date: Jan. 28, 2021

(65) Prior Publication Data
US 2022/0317058 A1 Oct. 6, 2022

(51) Int. Cl.
*G01N 21/89* (2006.01)
*G01N 21/95* (2006.01)
*G02B 21/00* (2006.01)

(52) U.S. Cl.
CPC ..... *G01N 21/8901* (2013.01); *G01N 21/9505* (2013.01); *G02B 21/0032* (2013.01); *G02B 21/0036* (2013.01); *G01N 2201/103* (2013.01)

(58) Field of Classification Search
CPC ........... G01N 21/8901; G01N 21/9505; G01N 2201/103; G02B 21/0032; G02B 21/0036
See application file for complete search history.

(56) References Cited

U.S. PATENT DOCUMENTS 6,011,618 A 1/2000 Iwata et al.
6,480,286 B1 * 11/2002 Kubo ..................... G01B 21/30
356/503
(Continued)

FOREIGN PATENT DOCUMENTS

JP 11-183394 A 7/1999
JP 2000-283728 A 10/2000
(Continued)

OTHER PUBLICATIONS

International Search Report (PCT/ISA/210) issued in PCT Application No. PCT/JP2019/029076 dated Oct. 8, 2019 with English translation (five (5) pages).
(Continued)

*Primary Examiner* — Edmond C Lau
*Assistant Examiner* — Joshua M Carlson
(74) *Attorney, Agent, or Firm* — Crowell & Moring LLP

(57) ABSTRACT

This defect inspection device for emitting illumination light onto a moving and rotating sample and inspecting for sample defects by scanning the sample in a spiral shape or concentric circle shapes comprises: an illumination and detection unit comprising an emission optical system and a detection optical system; a rotary stage for rotating the sample; a rectilinear stage for rectilinearly moving the rotary stage; and a controller for controlling the illumination and detection unit, rotary stage, and rectilinear stage. On the linear path of the rectilinear stage are a scanning start position where illumination light is emitted onto the sample and scanning is started and a sample delivery position where movement of the sample to the scanning start position starts. When the sample arrives at the scanning start position, the defect inspection device starts emitting the illumination light onto the sample without waiting for the rotation speed of the rotary stage to rise to a specified rotation speed for scanning
(Continued)

and raises the rotation speed of the rotary stage to the specified rotation speed while scanning the sample.

12 Claims, 8 Drawing Sheets

(56) References Cited

U.S. PATENT DOCUMENTS

| | | |
|---|---|---|
| 2007/0268484 A1 | 11/2007 | Matsui |
| 2008/0024773 A1* | 1/2008 | Miyazaki .......... G01N 21/4738 356/237.2 |
| 2009/0009753 A1 | 1/2009 | Horai et al. |
| 2010/0085855 A1 | 4/2010 | Yoshida et al. |
| 2012/0144938 A1 | 6/2012 | Inagaki et al. |
| 2015/0166393 A1* | 6/2015 | Marjanovic ........ B23K 26/0622 65/61 |

FOREIGN PATENT DOCUMENTS

| | | |
|---|---|---|
| JP | 2007-309713 A | 11/2007 |
| JP | 2009-14510 A | 1/2009 |
| JP | 2010-91295 A | 4/2010 |
| JP | 2011-75351 A | 4/2011 |

OTHER PUBLICATIONS

Japanese-language Written Opinion (PCT/ISA/237) issued in PCT Application No. PCT/JP2019/029076 dated Oct. 8, 2019 (four (4) pages).

International Preliminary Report on Patentability (PCT/IB/338 & PCT/IB/373) issued in PCT Application No. PCT/JP2019/029076 dated Feb. 3, 2022, Including English translation of document C2 (Japanese-language Written Opinion (PCT/ISA/237), filed on Jan. 3, 2022) (eight (8) pages).

* cited by examiner

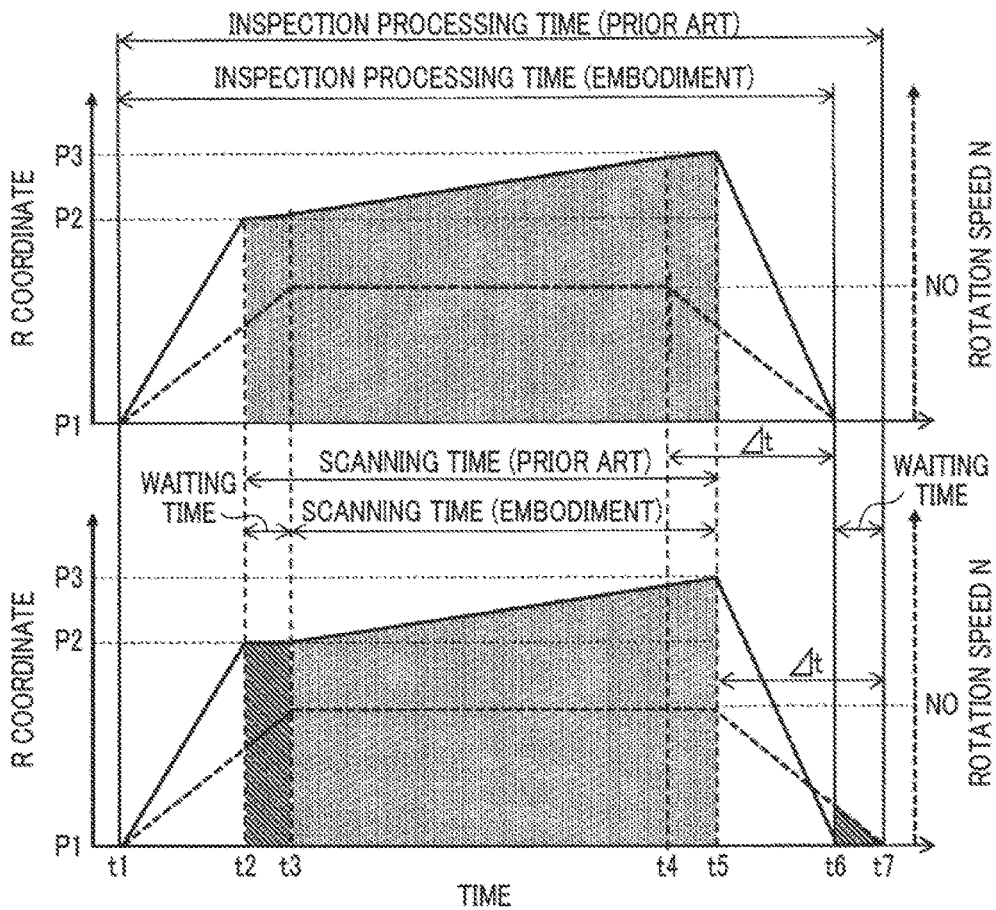
FIG. 7A
FIG. 7B
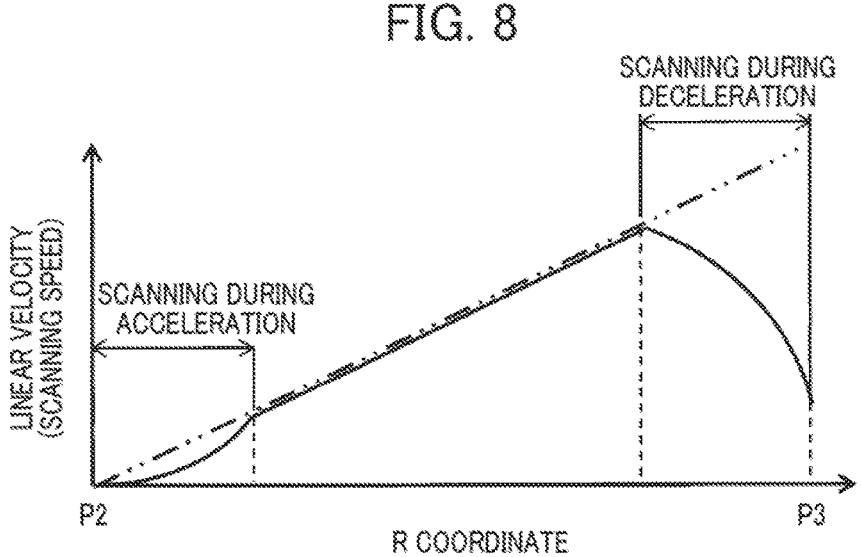
FIG. 8

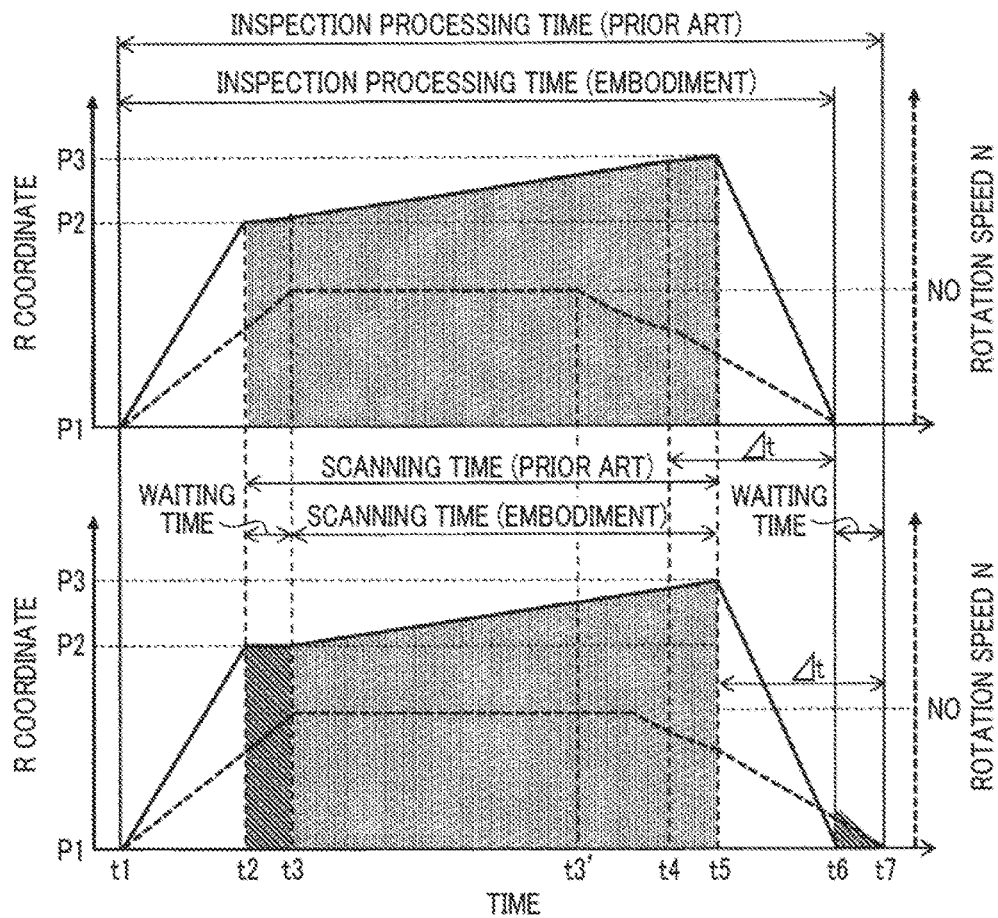
FIG. 10A
FIG. 10B
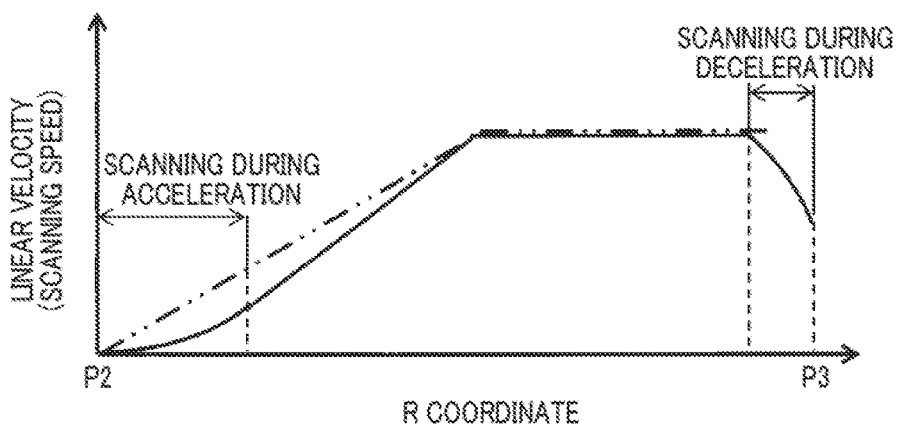
FIG. 11

DEFECT INSPECTION DEVICE AND DEFECT INSPECTION METHOD

TECHNICAL FIELD

The present invention relates to a defect inspection device and a defect inspection method for inspecting a defect of a sample such as a wafer.

BACKGROUND ART

In a semiconductor manufacturing process, defects (scratches, foreign matters, and the like) of a sample have a great impact on the yield, and it is important for yield management to feed back defect inspection information by a defect inspection device to the semiconductor manufacturing process and a manufacturing device. A defect inspection device (Patent Literature 1 and the like) for in-line inspection of a sample such as a wafer plays an important role in a semiconductor manufacturing process.

Patent Literature 1 discloses a defect inspection device in which a rotation movement θ as main scanning and a rectilinear (translational) movement R as sub-scanning are combined to each other and an illumination spot (irradiation position of illumination light) is spirally scanned on the surface of a semiconductor wafer to detect a defect. According to this literature, as a result of inspecting by driving a rotary stage at a substantially constant angular velocity and a rectilinear stage at a substantially constant linear velocity, the relative moving linear velocity of the illumination spot with respect to the surface of the wafer becomes larger at the outer periphery than at the inner periphery. Therefore, the irradiation time per point is shorter at the outer peripheral portion of the wafer than at the inner peripheral portion, and the sensitivity is lowered. Focusing on this problem, the literature discloses a technique in which the position of the illumination light spot on the stage is grasped by an encoder or the like and the intensity of the illumination light is adjusted at the outer peripheral portion of the wafer.

CITATION LIST

Patent Literature

[Patent Literature 1] Japanese Unexamined Patent Application Publication No. 2007-309713

SUMMARY OF INVENTION

Technical Problem

With the recent high integration of semiconductor devices, there is a strong demand for improvement in the sensitivity of defect inspection in order to detect finer defects. This is because the line width of a circuit wiring has become finer and the size of the fatal defect has also become finer. In addition, with the advance of the efficiency of production of semiconductor devices, it is required to perform defect inspection at a higher speed in a shorter time. In order to maximize the number of chips that can be taken from a single wafer, there is an increasing demand for countermeasures to detect defects that occur in the outer peripheral portion with high sensitivity.

In Patent Literature 1, for the purpose of improving the sensitivity, a partial reduction in sensitivity on the wafer surface caused by the rotation of the stage is taken into account. Sensitivity is an important issue in the literature, and high-speed inspection and shortening of inspection time, which have a trade-off relationship with high sensitivity, are not positively considered. In addition, with the recent higher integration of semiconductor devices, the optical system in optical defect inspection tends to approach the wafer more and more in order to further enhance the sensitivity. However, in Patent Literature 1, a structure in which the optical system approaches the wafer at a distance of several mm or less is not assumed, and there is no mention of the problems and countermeasures.

An object of the present invention is to achieve both higher sensitivity and a higher speed. In particular, an object of the present invention is to provide a defect inspection device and a defect inspection method in which a waiting time accompanying the rotation of a sample stage can be suppressed to shorten the inspection processing time and the inspection sensitivity can be improved by extending the scanning time.

Solution to Problem

In order to achieve the above-described object, the present invention provides a defect inspection device that irradiates a sample moving while rotating with illumination light and inspects a defect of the sample by scanning the sample spirally or concentrically, the device including: an illumination and detection unit that includes an emission optical system for irradiating the sample with the illumination light and a detection optical system for detecting inspection light scattered or reflected by the sample; a rotary stage that allows the sample to rotate; a rectilinear stage that allows the rotary stage to move straight; and a controller that controls the illumination and detection unit, the rotary stage, and the rectilinear stage, in which a scanning start position where the sample is irradiated with the illumination light to start scanning and a sample delivery position where the movement of the sample to the scanning start position is started are provided on a linear path of the rectilinear stage, and when the sample arrives at the scanning start position, the controller starts to irradiate the sample with the illumination light without waiting for the rotation speed of the rotary stage to rise to a specified rotation speed for scanning, and raises the rotation speed of the rotary stage to the specified rotation speed while scanning the sample.

Advantageous Effects of Invention

According to the present invention, a waiting time accompanying the rotation acceleration/deceleration of a sample stage can be suppressed to shorten the inspection processing time and the inspection sensitivity can be improved by extending the scanning time.

BRIEF DESCRIPTION OF DRAWINGS

FIGS. 7A and 7B are time charts each showing a sequence of the rotation speed of a rotary stage and the moving speed of a rectilinear stage during the inspection process in the first embodiment of the present invention and the inspection process by CAV scanning.

FIG. 8 is a time chart for showing a sequence of the linear velocity of the sample in the first embodiment of the present invention.

FIGS. 10A and 10B are time charts each showing a sequence of the rotation speed of the rotary stage and the moving speed of the rectilinear stage during the inspection process in the second embodiment of the present invention and the inspection process by the CLV scanning.

FIG. 11 is a time chart for showing a sequence of the linear velocity of the sample in the second embodiment of the present invention.

DESCRIPTION OF EMBODIMENTS

Figure 1:
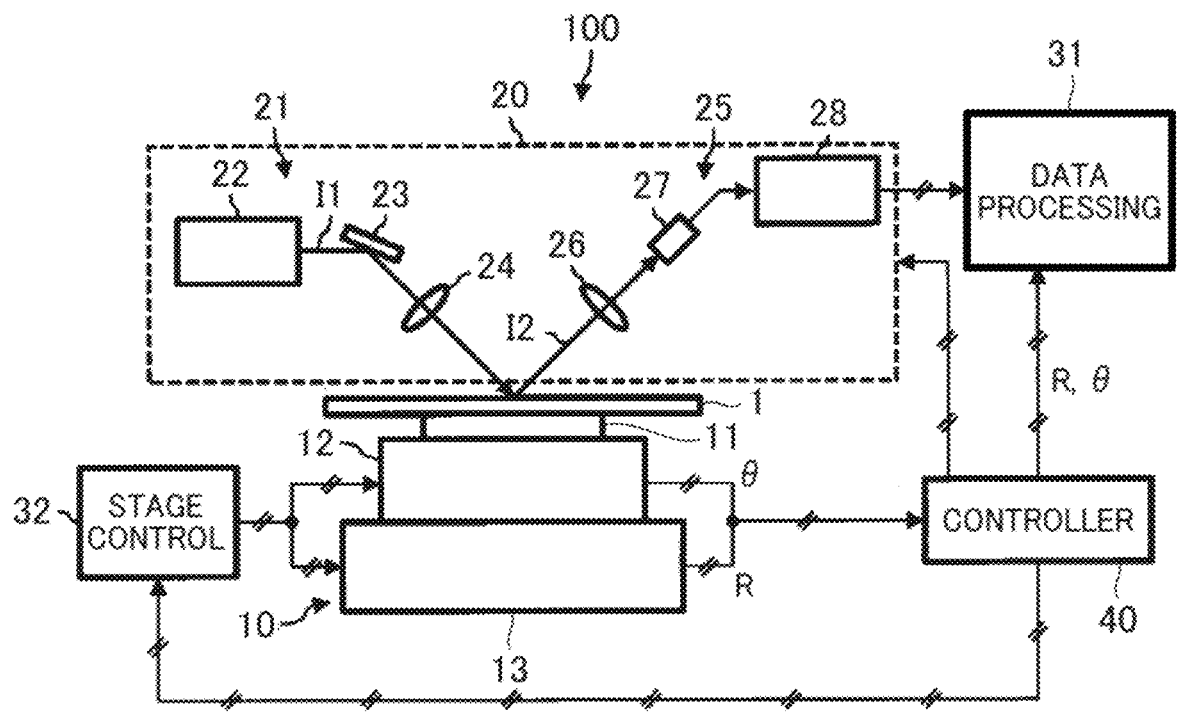
FIG. 1 is an outline view of a defect inspection device of a first embodiment of the present invention.

With the miniaturization of semiconductor devices, higher sensitivity of defect inspection has been required. Accordingly, in a defect inspection device according to the present invention, an optical system is brought as close as possible to a sample such as a wafer (to be described later), and light scattered, diffracted, and reflected in the sample is taken into a detection optical system in a wider range to realize high sensitivity.

On the other hand, when the optical system approaches the sample, there is a problem that there is no clearance where a conveying arm for conveying the sample is inserted in a scanning position. In this case, it is also conceivable to provide a lifting mechanism in a stage device to insert the conveying arm by lowering a sample stage. However, the stage device has large inertia and is elastically supported by a vibration isolation table, and vibrates in the gravity direction when the lifting mechanism is driven. Therefore, it takes time until the inspection preparation is completed after the vibration of the stage device subsides. In addition, there is a concern that the focus accuracy deteriorates due to vibration caused by the elevation of the sample stage. Therefore, the defect inspection device of the present invention employs a configuration in which a predetermined sample delivery position is provided and the sample stage with the sample set is moved to the scanning position. The sample stage is higher in rigidity and operation speed than the conveying arm, and the time required to set the sample at the scanning position can be shortened as compared with a case in which the conveying arm directly conveys the sample to the scanning position.

From the viewpoint of a linear velocity, an Rθ method for scanning a sample by Rθ driving is advantageous in that no reciprocating motion is involved as compared with an XY method (step and repeat method) for scanning a sample by XY driving. It should be noted that the "linear velocity" means a scanning speed, and is specifically a relative moving speed (tangential speed) of an illumination light spot, which is relatively moved spirally or concentrically with respect to the sample, to the sample. Accordingly, in the defect inspection device according to the present invention, the stage is moved by the Rθ method. The inspection processing time can be shortened by moving the sample stage to the scanning position from the sample delivery position while increasing the rotation speed. The "inspection processing time" described herein means the total time from the time the sample is loaded from the conveying arm to the sample stage to the time the sample is unloaded from the sample stage after scanning (inspecting) the sample in-plane.

Here, in the defect inspection device of the Rθ method, it is normal to start the scanning of the sample in a state where the stage is rotated at a specified rotation speed. As for the specified rotation speed, further increase is expected in the future due to a request for shortening the inspection time. In addition, from the viewpoint of compactification of the defect inspection device, it is necessary to minimize the distance between the sample delivery position and the scanning position. In the defect inspection device of the present invention, the distance between the sample delivery position and the scanning position is set to about 150 mm to 500 mm to achieve compactification. Accordingly, the stage moving time can be shortened, and the effect of shortening the inspection processing time can be expected.

However, in the case of the stage device having large inertia, it takes a longer time to raise the rotation speed of the stage in the stopped state to the specified rotation speed (or to stop the sample stage rotating at the specified rotation speed) as compared with straight movement between the specified rotation speed and the scanning position. Therefore, when the sample stage moves straight from the sample delivery position and arrives at the scanning position, the stage rotation speed does not reach the specified rotation speed. If the specified rotation speed is raised in response to a request from a user, the time required for rotation acceleration/deceleration is extended. On the other hand, if the moving distance is shortened, the moving time is shortened. In this case, the time difference between the time required for the rotation acceleration/deceleration and the time required for the stage movement is further increased. In the defect inspection device of the present invention, in the case where the scanning is started in a state where the stage is rotated at the specified rotation speed as usual, time is required to wait for reaching the specified rotation speed at the scanning position. When the sample stage is returned to the sample delivery position after the scanning, time may also be required to wait for the rotation stop of the sample stage at the sample delivery position. If the specified rotation speed is raised and the moving distance is shortened, the shortening of the entire inspection processing time can be expected due to the effect of shortening the scanning time and the moving time, but on the other hand, the ratio of the waiting time to the inspection processing time is increased due to an increase in the time difference between the time required for rotation acceleration and the time required for movement.

Accordingly, in the defect inspection device of the present invention, when the sample reaches the scanning position, the scanning is started without waiting for reaching the specified rotation speed. That is, in the defect inspection device in which the stage is moved between the sample delivery position and the scanning position while suppressing the distance between the sample such as a wafer and an optical system (illumination and detection unit) in order to achieve high sensitivity, the waiting time accompanying acceleration/deceleration of the stage rotation, particularly, acceleration is reduced. In addition, control of the linear velocity and the angular velocity of the stage is devised (to be described later) to maximize the net irradiation time in a specified sequence.

Hereinafter, embodiments of the present invention will be described by using the drawings.

First Embodiment

—Defect Inspection Device—

Figure 2:
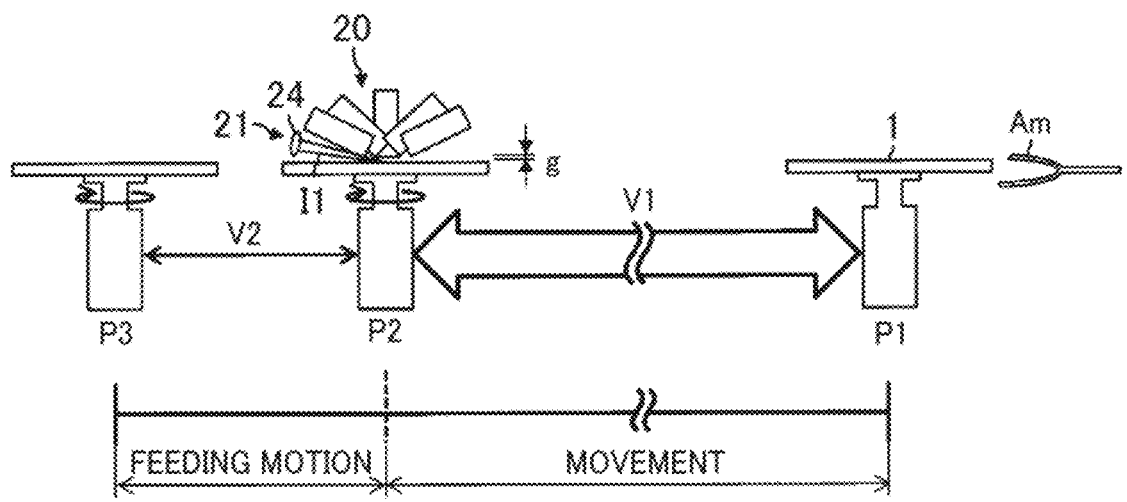
FIG. 2 is a schematic view for showing a moving route of a sample in the defect inspection device of the first embodiment of the present invention.
Figure 3:
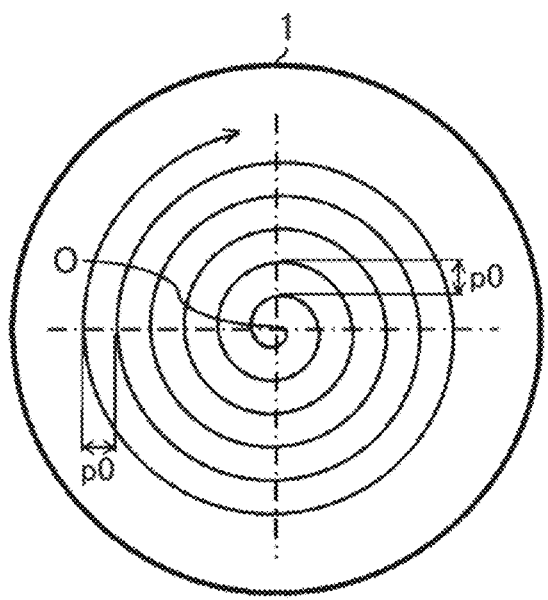
FIG. 3 is a plan view of the sample for schematically showing the scanning locus of the sample by the defect inspection device of the first embodiment of the present invention.
Figure 4:
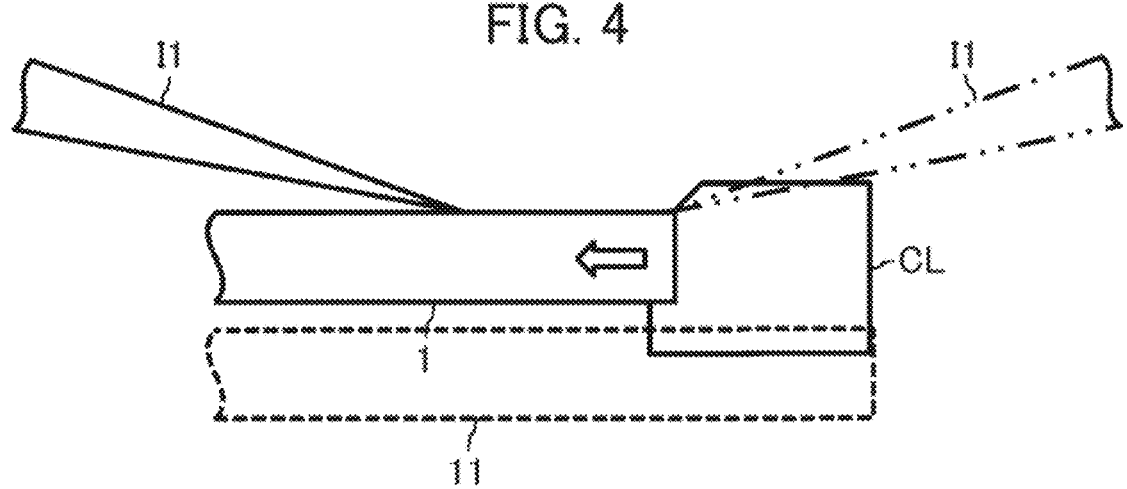
FIG. 4 is an explanatory view of the incident direction of illumination light and the feed direction of the sample by the defect inspection device of the first embodiment of the present invention.

FIG. 1 is an outline view of a defect inspection device of a first embodiment of the present invention, and FIG. 2 is a schematic view for showing a moving route of a sample in the defect inspection device of FIG. 1. In addition, FIG. 3 is a plan view of the sample for schematically showing the scanning locus of the sample by the defect inspection device of FIG. 1, and FIG. 4 is an explanatory view of the incident direction of illumination light and the feed direction of the sample by the defect inspection device of FIG. 1. A defect inspection device 100 shown in these drawings is a system in which a sample 1 moving while rotating is irradiated with illumination light I1 and the sample 1 is spirally or concentrically scanned to inspect a defect of the sample 1. The sample 1 is assumed to be a circular plate such as a wafer (including a wafer at each stage of a semiconductor manufacturing process such as a bare wafer, a wafer with a film, or a wafer with a pattern). However, a semiconductor device substrate other than a wafer may be used, and the sample 1 is not limited to a wafer. The defects detected by the inspection are scratches and undulations of the sample 1, foreign matters adhering to the sample 1, and the like. The defect inspection device 100 includes a stage device 10, an illumination and detection unit 20, a data processing circuit 31, a stage control circuit 32, and a controller 40. Next, these elements will be sequentially described. —Stage Device The stage device 10 is a rotary rectilinear stage having functions of rotary motion and rectilinear (translational) motion, and includes a sample stage 11, a rotary stage 12, and a rectilinear stage 13.

The sample stage 11 is a stage for horizontally holding the sample 1 such as a wafer. Various methods can be employed for the sample stage 11, such as a method for holding the sample 1 in a state where the back surface is floated by gripping the edge of the sample or the like, in addition to a method (Japanese Unexamined Patent Application Publication No. Hei 11-233597 and the like) for holding the sample 1 by adsorbing the back surface of the sample 1. The sample stage for absorbing the back surface of the sample 1 is used, for example, in the case where the defect inspection device 100 is used in a semiconductor device manufacturer. The sample stage for holding the sample 1 while floating the back surface is used, for example, in the case where the defect inspection device 100 is used in a wafer manufacturer that is not permitted to bring the back surface of the sample 1 into contact with the sample stage. For the sample stage for holding the sample 1 while floating the back surface, there are, for example, a method (FIG. 4) for holding the outer periphery of the sample 1 by a clamp CL and a method (Japanese Unexamined Patent Application Publication (Translation of PCT Application) No. 2017-504199 and the like) for holding the sample 1 by a pressing member while floating the same by a pneumatic pressure.

The rotary stage 12 is a stage for supporting the sample stage 11, and rotates about a vertical rotation axis (not shown) to rotate the sample 1 together with the sample stage 11. The rotary stage 12 is provided with an optically reading rotary encoder (not shown), and the rotary encoder detects the rotation angle ($\theta$ coordinate) of the rotary stage 12 and outputs the same to the controller 40. However, the $\theta$ coordinate detector is not limited to the rotary encoder, and a sensor capable of detecting the rotation angle with high accuracy can be employed instead of the rotary encoder.

The rectilinear stage 13 is a stage for supporting the rotary stage 12, and moves along a rail (not shown) extending in the radial direction (R axis direction) of the rotary stage 12 to linearly move the sample 1 in the horizontal direction together with the rotary stage 12 and the sample stage 11. The rectilinear stage 13 is provided with an optically reading linear encoder (not shown), and the linear encoder detects the position (R coordinate) on the R axis of the rectilinear stage 13 and outputs the same to the controller 40. However, the R coordinate detector is not limited to the linear encoder, and a sensor capable of detecting a position on a straight line with high accuracy can be employed instead of the linear encoder.

In the embodiment, a sample delivery position P1 and a scanning start position P2 are set on the R axis that is the linear path of the rectilinear stage 13, and the rotary stage 12 is moved along a straight line including the sample delivery position P1 and the scanning start position P2 by driving the rectilinear stage 13. The scanning start position P2 is a position where the sample 1 is irradiated with the illumination light I1 and the scanning of the sample 1 is started, specifically, a position where a specific point (center O (FIG. 3) in the embodiment) of the sample 1 matches the illumination light spot (the focal position of the illumination light I1) of the illumination and detection unit 20. The sample delivery position P1 of the other is a position where the movement of the sample 1 to the scanning start position P2 is started, and is also a position where the sample 1 is loaded on and unloaded from the sample stage 11 by a conveying arm Am (FIG. 2) in the embodiment. The sample delivery position P1 is apart from the illumination light spot. In the embodiment, the distance between the sample delivery position P1 and the scanning start position P2 is about 150 mm to 500 mm. —Illumination and Detection Unit The illumination and detection unit 20 includes an emission optical system 21 and a detection optical system 25. The emission optical system 21 is an optical system for irradiating the sample 1 with the illumination light I1, and includes an illumination light source (laser light source or the like) 22, a mirror 23, and an irradiation lens 24. The detection optical system 25 is an optical system for detecting inspection light 12 scattered or reflected by the sample 1, and includes a condenser lens 26, a photodetector 27, and a detection circuit 28. It should be noted that since high inspection sensitivity is required, the illumination and detection unit 20 approaches the sample 1 (FIG. 2). When the sample stage 11 is located just under the illumination and detection unit 20, a gap g between the sample stage 11 and the illumination and detection unit 20 is about several mm or less. In order to widely take the illumination light into the detector, the defect inspection device 100 of the embodiment is configured such that the distance between the illumination and detection unit 20 and the sample 1 is 0.5 mm to 5 mm or less. It is difficult to adopt a configuration in which the sample 1 is conveyed by the conveying arm Am, inserted into the gap g, and placed on the sample stage 11.

In the embodiment, the emission optical system 21 is installed on the side opposite to the sample delivery position P1 across the scanning start position P2. Therefore, the sample 1 is obliquely irradiated with the illumination light I1 from the side opposite to the sample delivery position P1 (FIG. 2). One of the reasons is to arrange the emission optical system 21 while avoiding the loading and unloading workspace of the sample and to suppress the distance between the sample delivery position P1 and the scanning start position P2. The illumination light source 22 is provided with a shutter (not shown), and the sample 1 is irradiated with the illumination light I1 and the illumination light I1 is blocked by opening and closing the shutter. When the shutter is opened, the illumination light I1 emitted from the illumination light source 22 is irradiated to the sample 1 via the mirror 23 and the irradiation lens 24. When the sample 1 is held by the stage device 10 and moves while rotating, as shown in FIG. 3, the illumination light I1 is irradiated by drawing a spiral locus from the center O of the sample 1 to the outer edge, and the entire surface of the sample 1 is scanned. The inspection light 12 scattered or reflected by the sample 1 is detected via the condenser lens 26, the photodetector (for example, a photoelectric sensor) 27, and the detection circuit 28, and the detection result is output from the detection circuit 28 to the data processing circuit 31.

It should be noted that the controller 40 is programmed to drive the rectilinear stage 13 in the direction approaching the emission optical system 21 from the scanning start position P2 at the time of defect inspection in the embodiment. That is, in the case of the embodiment, since the emission optical system is arranged on the side opposite to the sample delivery position P1, the rectilinear stage 13 is fed in the direction away from the sample delivery position P1 with the scanning start position P2 as a starting point during scanning. Accordingly, even in the case where a stage for holding the sample 1 with a plurality of clamps CL is attached as the sample stage 11 as exemplified in, for example, FIG. 4, the scanning can be performed from the center O to the outer edge of the sample 1 without interference between the illumination light I1 and the clamps.

That is, since the incident angle (the angle formed with respect to the vertical direction) of the illumination light I1 with respect to the sample 1 is large, if the illumination light I1 is irradiated from the sample delivery position P1 side as shown by the two-dot chain line in FIG. 4, the outer peripheral portion of the sample 1 cannot be sufficiently inspected because the light is shielded by the clamps CL at the end of the scanning. In addition, even if the arrangement of the emission optical system 21 and the feed direction of the rectilinear stage 13 during scanning are the same as in the embodiment, in the case where the scanning is started from the outer periphery of the sample 1 (the scanning start position P2 is set to the outer edge of the sample 1), the same problem occurs at the beginning of the scanning. On the other hand, in the embodiment, for example, even in the case where the sample stage 11 having the clamps CL is used, the entire surface of the sample 1 can be inspected without interference between the illumination light I1 and the clamps CL from the start to the end of the scanning.

Figure 5:
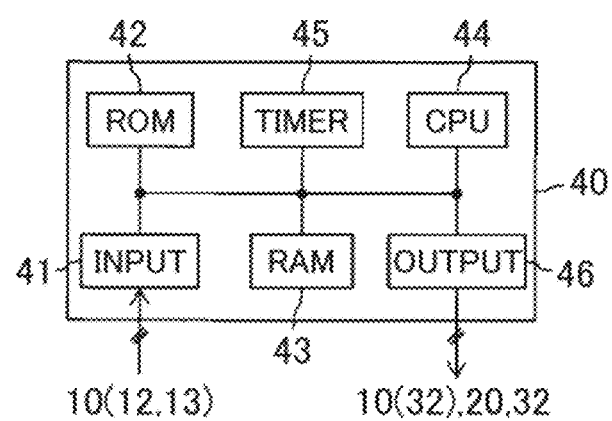
FIG. 5 is a schematic diagram of a hardware configuration of a controller provided in the defect inspection device of the first embodiment of the present invention.

In addition, although FIG. 2 shows the case in which the laser light is obliquely irradiated, other light sources such as a broadband light source can be employed as the illumination light source 22, and the arrangement of the light source and the stage and the irradiation direction from the light source to the sample can vary depending on the type of the light source. —Data Processing Circuit In the data processing circuit 31, scan information (inspection result) is generated from the detection result by the illumination and detection unit 20 and the Rθ coordinate input from the controller 40. The scan information generated by the data processing circuit 31 includes the position of defects such as foreign matters and scratches, the size and shape of defects based on the detected signal amount, and the like. —Stage Control Circuit The stage control circuit 32 is a circuit for controlling the operation of the stage device 10, and includes, for example, a motor driver for driving a drive device (motor) of the rotary stage 12, a motor driver for driving a drive device (motor) of the rectilinear stage 13, and the like. When a command value for the operation of the stage device 10 is input from the controller 40, the drive device is driven by the stage control circuit 32 in response to a command from the controller 40, and the rotary stage 12 and the rectilinear stage 13 are operated. —Controller FIG. 5 is a schematic diagram of a hardware configuration of the controller 40. The controller 40 is a computer that controls the operations of the illumination and detection unit 20, the rotary stage 12, the rectilinear stage 13 (stage device 10), and the like. The controller 40 includes an input interface 41, a ROM (for example, EPROM) 42, a RAM 43, a CPU 44, a timer 45, an output interface 46, and the like.

Signals (R and θ coordinates of the sample stage 11) from the encoders of the rotary stage 12 and the rectilinear stage 13 and inspection conditions input from an input device (not shown) such as a keyboard in response to the operation of an operator are input to the input interface 41. The inspection conditions include, for example, the type, size, shape, and the like of the sample 1. The ROM 42 stores arithmetic expressions, programs (to be described later), and data necessary for the defect inspection. The RAM 43 stores numerical values in the middle of an operation, information such as the inspection conditions input from the input device, and the like. The output interface 46 outputs a command signal to the stage device 10 (stage control circuit 32) and the illumination and detection unit 20 in response to a command from the CPU 44. In addition, the controller 40 outputs coordinate detection signals (calculated R and θ coordinates of the sample stage 11) of the rotary stage 12 and the rectilinear stage 13 to the data processing circuit 31 via the output interface 46.

The CPU 44 executes predetermined processing on the basis of information input via the input interface 41 in accordance with a program loaded from the ROM 42. The stage device 10 and the illumination and detection unit 20 are also controlled by a command value output from the CPU 44 on the basis of the inspection conditions, the Rθ coordinate of the sample stage 11 to be measured, and the like, and the sample 1 is thereby scanned. —Operation—

Figure 6:
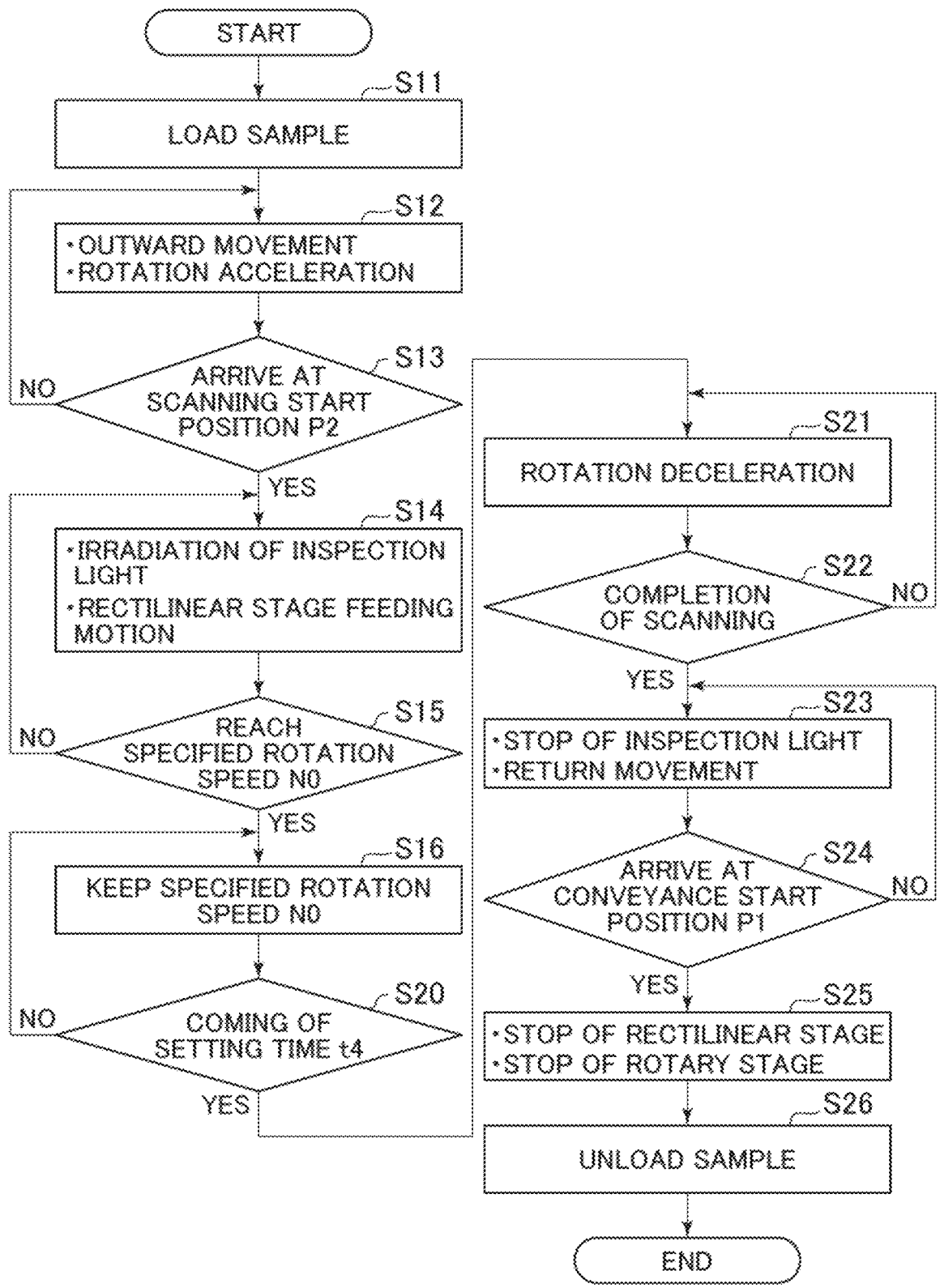
FIG. 6 is a flowchart for showing a control procedure of an illumination and detection unit and a stage device by the controller during a defect inspection process of the first embodiment of the present invention.

FIG. 6 is a flowchart for showing a control procedure of the illumination and detection unit and the stage device by the controller during the defect inspection process. In addition, FIG. 7(a) is a time chart for showing a sequence of the rotation speed of the rotary stage and the moving speed of the rectilinear stage during the inspection process, and FIG.

8 is a time chart for showing a sequence of the linear velocity of the sample. In FIG. 7, a solid polygonal line indicates the position (R coordinate) of the sample 1 at each time, and a broken polygonal line indicates the rotation speed N of the sample 1 (rotary stage 12) at each time. The rotation speed N and times t1 to t7 are default values, and the rotary stage 12 and the rectilinear stage 13 are controlled to operate in accordance with the schedule shown in FIG. 7. In FIG. 8, changes in the linear velocity in the embodiment from the start of scanning to the end of scanning are indicated by a solid line, and changes in the linear velocity due to CAV (Constant Angular Velocity) scanning are indicated by a two-dot chain line. The "CAV scanning" means a scanning method in which the rotation speed (angular velocity) of the rotary stage 12 during scanning is kept constant.

The "inspection process" described here is a sequence of the defect inspection per sample, and includes steps of outward movement of the sample 1 held on the sample stage 11 from the sample delivery position P1 to the scanning start position P2, scanning, and return movement to the sample delivery position P1. That is, a series of steps from the time the sample 1 starts from the sample delivery position P1 to the time the sample 1 returns to the sample delivery position P1 after scanning is the "inspection process". The controller 40 executes the following procedure by the CPU 44 according to the program stored in the ROM 42. On the basis of the flowchart of FIG. 6, the sequence of the inspection process of the embodiment will be described below with reference to FIG. 7(a) and FIG. 8. In the embodiment, a sequence to which the CAV scanning is applied is exemplified. This is an example in which a setting time t4 (to be described later) comes in a state where the rotation speed N of the rotary stage 12 is constant and the scanning is shifted to scanning during deceleration (to be described later). —Step S11

When starting the defect inspection of the sample 1, the controller 40 first loads, in Step S11, the sample 1 taken out of, for example, a pod by the conveying arm Am to the sample stage 11 that is made to stand by at the sample delivery position P1. The pod is a case for storing a sample such as a wafer. The pod storing the sample is connected to a predetermined position of the defect inspection device, and the sample is taken in and out of the inspection device by opening and closing the pod. A sample conveying route from the pod to the sample delivery position P1 may include a pre-aligner (not shown), and the sample 1 may be loaded to the sample delivery position P1 via the pre-aligner. —Step S12

When the sample 1 is loaded, the controller 40 proceeds to Step S12 where the rotary stage 12 and the rectilinear stage 13 are started at the sample delivery position P1 (time t1) and the rectilinear stage 13 moves the sample 1 outward to the scanning start position P2 while increasing the rotation speed N. The acceleration of the rotation speed N is the default value (constant value). Although it is desirable that the rotary stage 12 and the rectilinear stage 13 are started at the same time, a timing error caused by, for example, responsiveness is allowed without considering the strictness of the start timing. In addition, the first moving speed V1 (moving speed of the rectilinear stage 13) of the sample 1 during the outward movement is set to a high speed, and can be exemplified to be set to, for example, the maximum moving speed of the rectilinear stage 13 or a constant value close thereto. —Step S13

When the movement of the sample 1 is started, the controller 40 proceeds to Step S13 to determine whether the sample 1 has arrived at the scanning start position P2 while continuing the acceleration of the rotation speed N (in this example, whether the rotational axis of the rotary stage 12 matches the scanning start position P2). In this determination, for example, the current position of the sample 1 is computed on the basis of a signal from the linear encoder provided in the rectilinear stage 13, and the computed current position is compared with the specified scanning start position P2. The controller 40 continues the procedure of Step S12 until the sample 1 arrives at the scanning start position P2, and when the sample 1 arrives at the scanning start position P2 (time t2), the controller 40 proceeds to the next Step S14. —Step S14

When the sample 1 arrives at the scanning start position P2, the controller 40 proceeds to Step S14 to irradiate the sample 1 with the illumination light I1 and start scanning without waiting for the rotation speed N to rise to a specified rotation speed N0 for scanning (time t2). The inspection result is obtained by the data processing circuit 31 on the basis of the subsequent scan information. The illumination light I1 is irradiated by opening the shutter (not shown) of the illumination light source 22 described above. In addition, the moving speed of the rectilinear stage 13 is switched from the first moving speed V1 to a second moving speed V2 at the same time as the start of scanning. The second moving speed V2 is slower than the first moving speed V1, and is controlled by the controller 40 in accordance with the rotation speed N of the rotary stage 12 so that the scanning locus draws a spiral with a pitch p0 (FIG. 3) on the entire surface of the sample 1. Since the second moving speed V2 is determined according to the rotation speed N under the condition that the pitch p0 of the scanning locus is constant, it is not strictly a constant speed. Until the rotation speed N reaches the specified rotation speed N0 after starting the scanning, the rotation speed N of the rotary stage 12 rises at a constant acceleration continuously from the outward movement (times t2 to t3). The scanning during the rise of the rotation speed until the rotation speed N reaches the specified rotation speed N0 is distinguished from the above-described CAV scanning and is appropriately described as "scanning during acceleration". —Step S15

When the scanning of the sample 1 is started, the controller 40 proceeds to Step S15 to determine whether the rotation speed N has reached the specified rotation speed N0. The rotation speed N can be obtained from the time change of the rotation angle on the basis of the signal from the rotary encoder of the rotary stage 12, and the determination can be executed by comparing the computed rotation speed N with the specified rotation speed N0 read from the storage device such as the ROM 42 and the RAM 43. The controller 40 continues the procedure (scanning during acceleration) of Step S14 until the rotation speed N reaches the specified rotation speed N0, and when the rotation speed N reaches the specified rotation speed N0 (time t3), the procedure proceeds to the next Step S16. —Step S16

When the rotation speed N reaches the specified rotation speed N0 (time t3), the controller 40 proceeds to Step S16 to keep the rotation speed N at the specified rotation speed N0 and shift from the scanning during acceleration to the CAV scanning. —Step S20

When shifting to the CAV scanning (time t3), the controller 40 proceeds to Step S20 to determine whether the setting time t4 has come. The setting time t4 is a time earlier by only a required stop time $\Delta t$ ($=t6-t4$) required to stop the rotary stage 12 rotating at the specified rotation speed N0 by calculating backward from the specified time t6 at which the sample 1 returned from the scanning completion position P3 after the completion of scanning arrives at the sample delivery position P1. The required stop time $\Delta t$ is a known value, and for example, a design value or an experimental value can be used. The coming of the setting time t4 can be determined by, for example, the time counted by the timer 45 or the current position (R coordinate) of the sample 1. The controller 40 continues the procedure (CAV scanning) of Step S16 until the setting time t4 comes, and proceeds to the next Step S21 when the setting time t4 comes. —Step S21

When the setting time t4 comes, the controller 40 proceeds to Step S21 to start to lower the rotation speed N of the rotary stage 12 from the setting time t4 while continuing the scanning of the sample 1 and lower the linear velocity of the sample 1 by the illumination light I1 (FIG. 8). The scanning during the lowering of the rotation speed from the time t4 to the time t5 at which the scanning is completed (at which the sample 1 reaches the scanning completion position P3) is distinguished from the above-described CAV scanning and is appropriately described as "scanning during deceleration". —Step S22

When the deceleration of the rotation speed N is started, the controller 40 proceeds to Step S22 to determine whether the sample 1 has arrived at the scanning completion position P3 and the scanning has been completed (in the embodiment, whether the illumination light spot has reached the outer edge of the sample 1). The scanning completion position P3 is determined by the radius (a setting value or an input value) of the sample 1, and the determination is executed by comparing the current position of the sample 1 with the scanning completion position P3. The controller 40 continues the procedure (scanning during deceleration) of Step S21 until the sample 1 arrives at the scanning completion position P3, and when the sample 1 arrives at the scanning completion position P3 (time t5), the controller 40 proceeds to the next Step S23. —Step S23

When the scanning is completed, the controller 40 proceeds to Step S23 where the irradiation of the illumination light I1 on the sample 1 is stopped (time t5) and the sample 1 is returned from the scanning completion position P3 to the sample delivery position P1 while continuously decelerating the rotation speed N of the rotary stage 12. A third moving speed V3 (moving speed of the rectilinear stage 13) during the return movement is faster than the second moving speed V2, and may be set to a value different from the first moving speed V1 during the outward movement, but is set to the same value as the first moving speed V1 in the embodiment. The irradiation of the illumination light I1 is stopped by closing the shutter (not shown) of the illumination light source 22 described above. —Step S24

When the return movement of the sample 1 is started, the controller 40 proceeds to Step S24 to determine whether the sample 1 has arrived at the sample delivery position P1 while continuing the deceleration of the rotation speed N. The determination is executed by comparing the current position of the sample 1 with the sample delivery position P1. The controller 40 continues the procedure of Step S23 until the sample 1 arrives at the sample delivery position P1, and when the sample 1 arrives at the sample delivery position P1 (time t6), the controller 40 proceeds to the next Step S25. —Step S25

When the sample 1 arrives at the sample delivery position P1, the controller 40 proceeds to Step S25 to stop the rectilinear stage 13 at the sample delivery position P1 (time t6). At the same time when the sample 1 arrives at the sample delivery position P1, the rotary stage 12 is also stopped. As described above, the rotary stage 12 is stopped just at the time t6 when the sample 1 arrives at the sample delivery position P1 after the scanning of the sample 1. The rotary stage 12 and the rectilinear stage 13 are intended to stop at the same time, but a timing error caused by, for example, responsiveness is allowed. —Step S26

After the rotary stage 12 and the rectilinear stage 13 are stopped, the controller 40 proceeds to Step S26 to unload the sample 1 from the sample stage 11 by the conveying arm Am and store the same in, for example, the pod. Accordingly, the inspection process of one sample 1 is completed. The controller 40 repeatedly executes the above processing while exchanging the sample 1 according to an instruction of the operator. —Effect—

(1) FIG. 7(b) shows, for comparison, a time chart for showing a sequence of the rotation speed of the rotary stage and the moving speed of the rectilinear stage during the inspection process by the CAV scanning. As shown in the drawing, in the defect inspection by the CAV scanning, after the rotary stage arrives at the scanning start position, the scanning is started after the rotation speed of the rotary stage reaches the specified rotation speed NO. Therefore, a waiting time (times t2 to t3 hatched in the drawing) from the time the sample arrives at the scanning start position to the time the rotation speed reaches the specified rotation speed NO occurs before scanning.

On the other hand, according to the embodiment, when arriving at the scanning start position P2, the scanning (scanning during acceleration) is started without waiting for the rotation speed N to reach the specified rotation speed NO, and thus the waiting time before scanning that occurred in the past is eliminated. Therefore, as shown in FIG. 7, the inspection processing time is shortened as compared with that of the defect inspection by the CAV scanning.

On the other hand, since the scanning is started before the rotation speed N completely rises to the specified rotation speed NO in the embodiment, the average linear velocity during the scanning becomes lower than before under the same condition of the specified rotation speed NO. That is, if the scanning locus (total distance) is the same, the scanning time is extended by a decrease in the average linear velocity. The times t2 to t5 shaded in FIG. 7(a) are the scanning time in the embodiment, and the times t3 to t5 shaded in FIG. 7(b) are the scanning time according to the conventional method. With the same illumination light intensity, the inspection sensitivity is improved as much as the scanning time is extended in the embodiment as compared with the conventional method.

As described above, while the inspection processing time can be shortened by suppressing the waiting time accompanying the rotational acceleration of the sample stage 11, the inspection sensitivity can be improved by extending the scanning time, so that antinomic effects of shortening the inspection processing time and improving the inspection sensitivity can be realized.

(2) In the defect inspection by the CAV scanning shown in FIG. 7(b), the rotation of the rotary stage is decelerated after the scanning is completed. Therefore, even after the scanning, a waiting time (times t6 to t7 hatched in the drawing) occurs from the arrival of the sample at the sample delivery position to the stop of the rotary stage.

On the other hand, since the rotation deceleration of the rotary stage 12 is started by calculating backward from the arrival time (time t6) of the sample 1 to the sample delivery position P1 after the scanning so that the rotary stage 12 and the rectilinear stage 13 stop at the same time, the waiting time caused after the scanning in the past is also eliminated. By suppressing the waiting time accompanying the rotation deceleration of the sample stage 11 together, the inspection processing time can be further shortened.

(3) In addition, the rotation deceleration of the rotary stage 12 is started while scanning the sample 1 from the setting time t4 to reduce the linear velocity in the embodiment. Accordingly, the scanning time is further extended and the inspection sensitivity is improved. In particular, since the scanning is performed from the center of the sample 1 toward the outer edge in the embodiment, the linear velocity becomes faster at the end of the scanning when approaching the scanning of the outer periphery in the CAV scanning, but the linear velocity decreases as compared with the CAV scanning because the rotation speed decreases in the embodiment (FIG. 8). Therefore, the inspection sensitivity tends to decrease at the outer peripheral portion as compared with the center in the CAV scanning in the accuracy of the defect inspection, but the sensitivity is intensively improved particularly at the outer peripheral portion of the sample in the embodiment. Thus, it is possible to detect defects with high sensitivity up to the outer peripheral portion, thereby contributing to the improvement of the reliability of the defect inspection.

However, for example, in the case where the scanning is performed by feeding the rectilinear stage 13 from the scanning start position P2 toward the sample delivery position P1, the distance of the return movement becomes shorter than that of the outward movement. In this case, if the setting time t4 comes after the sample 1 arrives at the scanning completion position P3, the rotation speed N starts to decrease after the scanning is completed and the rotation is stopped at the timing when the sample 1 arrives at the sample delivery position P1 as long as the essential effect (1) described above is obtained.

(4) In addition, the scanning start position P2 is set at a position where the center O of the sample 1 is irradiated with the illumination light I1, and the rectilinear stage 13 is fed in the direction approaching the emission optical system 21 for obliquely irradiating the illumination light I1. Accordingly, even in the case where the sample stage 11 having the clamp CL is used, the entire surface of the sample 1 can be scanned from the center O of the sample 1 to the outer edge as described above.

However, for example, in the case where the use of the sample stage having an element blocking the illumination light I1 such as the clamp CL is not assumed, the entire surface of the sample 1 can be inspected regardless of the arrangement of the emission optical system 21, the irradiation direction of the illumination light I1, the feed direction of the rectilinear stage 13, and the like. In the case where it is not necessary to consider the interference of the sample stage 11 with the illumination light I1, the settings of the arrangement of the emission optical system 21, the scanning start position P2, the irradiation direction of the illumination light I1, the feed direction of the rectilinear stage 13, and the like can be appropriately changed.

(5) In addition, since the irradiation of the illumination light I1 is started by a mechanical operation of opening the shutter (not shown), a shutter time lag can occur. If the sample 1 is scanned from the outer periphery, there is a possibility of inspection omission due to the shutter time lag when starting the scanning. On the other hand, if the scanning is started from the center O of the sample 1 as in the embodiment, the occurrence of inspection omission at the outer peripheral portion can be suppressed.

However, it does not matter whether the scanning is started from the center of the sample 1 or the scanning is started from the outer periphery as long as the essential effect (1) described above is obtained, and the setting of the scanning start position P2 can be appropriately changed.

Second Embodiment

Figure 9:
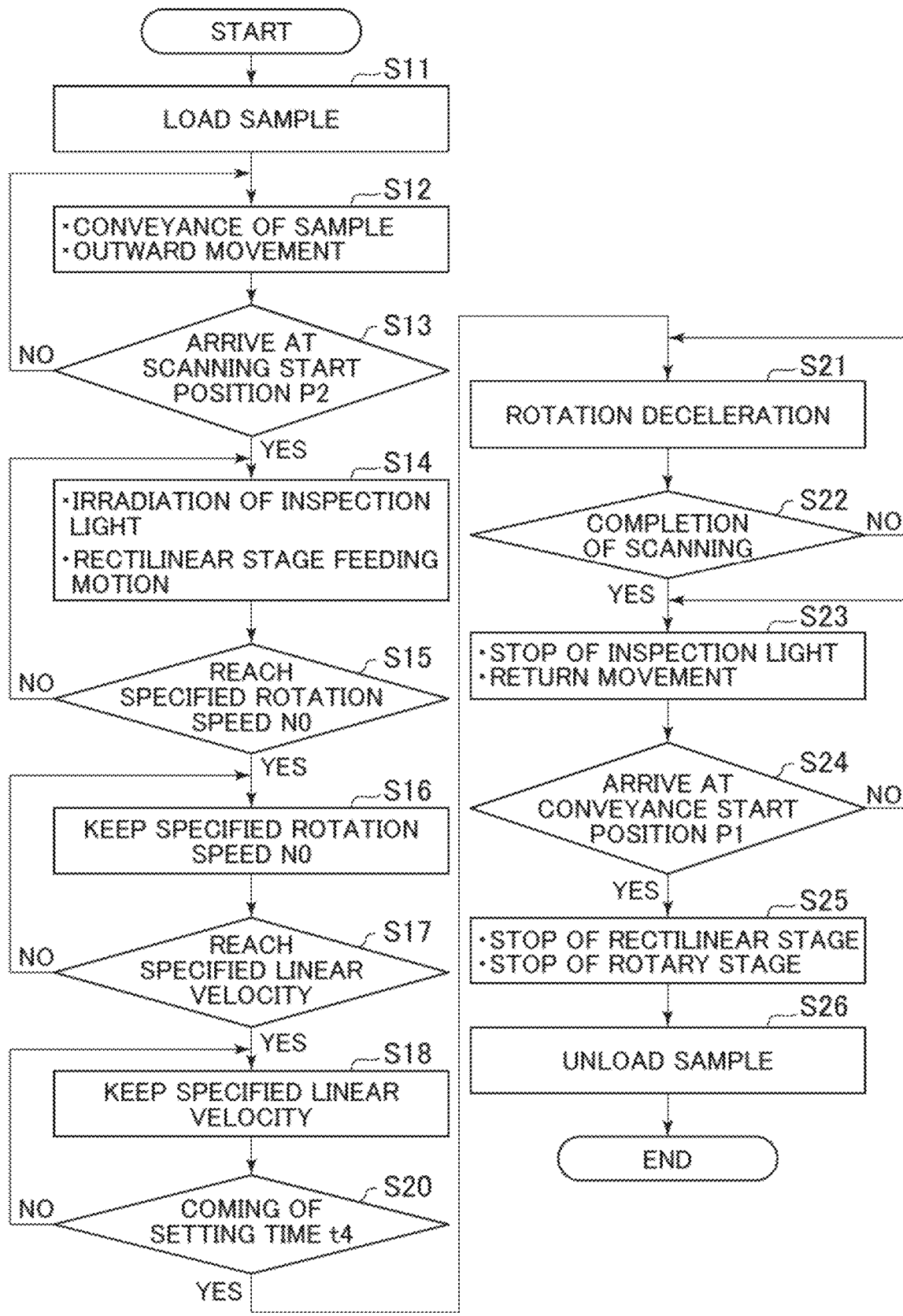
FIG. 9 is a flowchart for showing a control procedure of the illumination and detection unit and the stage device by the controller during the defect inspection process of a second embodiment of the present invention.

FIG. 9 is a flowchart for showing a control procedure of the illumination and detection unit and the stage device by the controller during the defect inspection process of a second embodiment of the present invention. FIG. 10 are time charts each showing a sequence of the rotation speed of the rotary stage and the moving speed of the rectilinear stage during the inspection process in the second embodiment of the present invention and the inspection process by the CLV (Constant Linear Velocity) scanning. The "CLV scanning" is a scanning method in which the linear velocity (scanning velocity) is kept constant. FIG. 11 is a time chart for showing a sequence of the linear velocity of the sample in the second embodiment of the present invention. FIG. 9 to FIG. 11 correspond to FIG. 6 to FIG. 8 of the first embodiment. In FIG. 10, a solid polygonal line indicates the position (R coordinate) of the sample 1 at each time, and a broken polygonal line indicates the rotation speed N at each time. In FIG. 10, the times t1 to t7 are written in accordance with FIG. 7 from the viewpoint of indicating the occurrence time of the event corresponding to the first embodiment, but do not mean the same timings as the times t1 to t7 of FIG. 7. In addition, in FIG. 11, changes in the linear velocity in the embodiment from the start of scanning to the end of scanning are indicated by a solid line, and changes in the linear velocity by the CLV scanning are indicated by a two-dot chain line.

The embodiment is different from the first embodiment in that the invention is applied to the CLV scanning in which the linear velocity is kept constant at the outer peripheral portion of the sample where the linear velocity increases. In the embodiment, the defect inspection device 100 is configured so that the setting time t4 comes in a state where the linear velocity is constant. On the basis of the flowchart of FIG. 9, the sequence of the inspection process of the embodiment will be described below with reference to FIG. 10(a) and FIG. 11.

The sequence of the embodiment is different from that of the first embodiment in that Steps S17 and S18 are added between Steps S16 and S20, and the procedures of Steps S11 to S16 and S20 to S26 are substantially the same as those of the first embodiment.

In the embodiment, when shifting to a scanning state where the rotation speed N is kept at the specified rotation speed N0 in Step S16 (time t3), the controller 40 determines whether the linear velocity has reached a specified linear velocity (Step S17). The linear velocity can be obtained from the scanning position on the sample and the rotation speed on the basis of the signals of the linear encoder and the rotary encoder input from the stage device 10. The specified rotation speed is recorded in a storage device such as the ROM 42 and the RAM 43, and is read from the storage device. If the linear velocity has not reached the specified linear velocity (linear velocity <specified linear velocity), the controller 40 continues the procedure of Step S16, and if the linear velocity has reached the specified linear velocity, the controller 40 proceeds to the next Step S18.

When the linear velocity reaches the specified linear velocity (time t3'), the controller 40 controls the rotation speed N in accordance with the scanning position on the sample so as to keep the linear velocity at the specified linear velocity, and shifts to the CLV scanning (Step S18). In the CLV scanning state (time t3' to t4), the rotation speed N decreases as the scanning position moves to the outer peripheral side of the sample 1. When shifting to the CLV scanning, the controller 40 proceeds to Step S20 to determine whether the setting time t4 has come.

Other points are the same as those of the first embodiment. Even in the embodiment, when the sample 1 arrives at the scanning start position P2, the scanning is started without waiting for the rotation speed N to reach the specified rotation speed NO, and when the setting time t4 comes, the rotation speed N starts to decelerate. FIG. 10(a) and FIG. 11 show an example in which the scanning is not completed at the time point when the setting time t4 comes, and the CLV scanning is shifted to the scanning during deceleration at the time t4.

As described above, the present invention can also be applied to the defect inspection by the CLV scanning, and has the same effect as the first embodiment.

Third Embodiment

In the embodiment, an example in which the illumination light intensity is controlled according to the linear velocity (scanning velocity) in the defect inspection described in the first or second embodiment will be described. In the first and second embodiments, in the case where the illumination light I1 is irradiated spirally or concentrically from the center O to the outer periphery to scan the sample 1, the linear velocity becomes slow in the central portion of the sample 1 where the scanning during acceleration is performed. In the case where the irradiation amount of the illumination light I1 can be excessive in the central portion of the sample 1 where the linear velocity decreases, it is also necessary to suppress the intensity of the illumination light I1. In addition, not only when the linear velocity decreases, but also when there is a foreign matter having a large diameter on the surface of the sample 1, the excessive irradiation of the illumination light I1 may cause destruction of the foreign matter and thermal damage of the sample 1.

Figure 12:
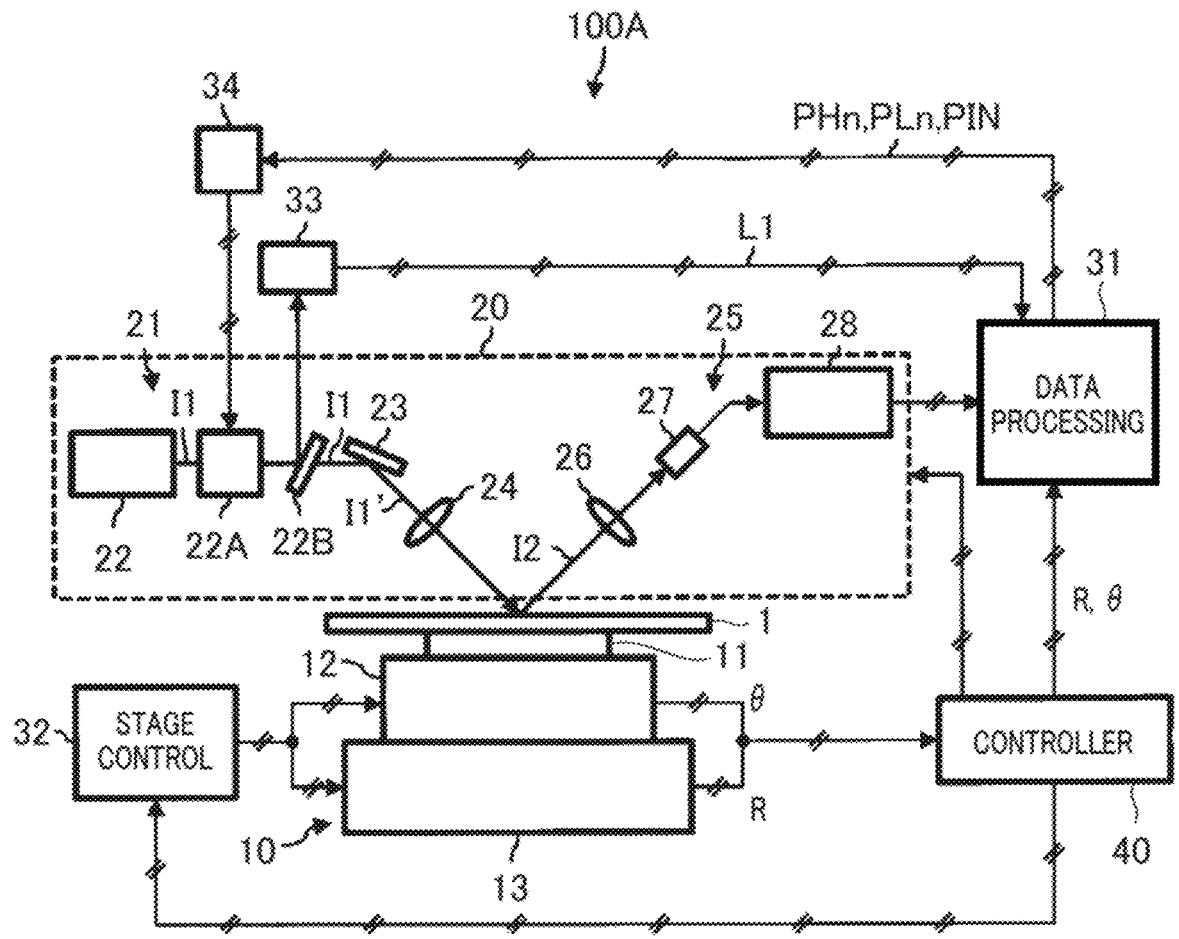
FIG. 12 is an outline view of a defect inspection device of a third embodiment of the present invention.
Figure 13:
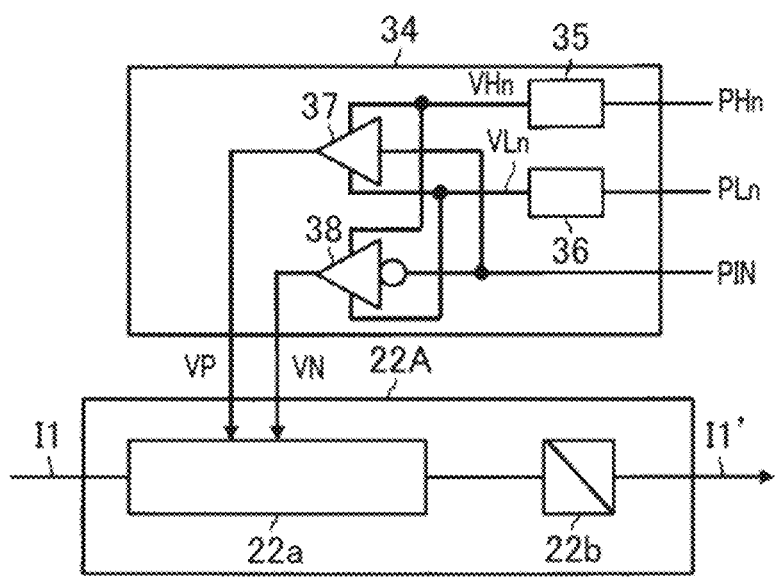
FIG. 13 is a diagram for showing a configuration example of a light intensity modulator and a light intensity control circuit in the third embodiment of the present invention.

FIG. 12 is an outline view of a defect inspection device of the embodiment, and FIG. 13 is a diagram for showing a configuration example of a light intensity modulator and a light intensity control circuit. A defect inspection device 100A of the embodiment has a configuration in which a light intensity modulator 22A, a beam splitter 22B, a light intensity sensor 33, and a light intensity control circuit 34 are added to the defect inspection device 100 shown in FIG. 1.

The light intensity control circuit 34 is means for controlling the light intensity modulator 22A in a plurality of stages on the basis of voltage control signals PHn and PLn from the data processing circuit 31, and includes variable voltage generating circuits 35 and 36 and switching circuits 37 and 38. The variable voltage generating circuits 35 and 36 generate voltages VHn and VLn corresponding to the voltage control signals PHn and PLn (n is a positive integer). The switching circuit 37 outputs the voltage VLn as a light intensity modulation signal VP when a switching signal PIN from the data processing circuit 31 is L (Low), and outputs the voltage VHn as the light intensity modulation signal VP when the switching signal PIN is H (High). The switching circuit 38 outputs the voltage VHn as a light intensity modulation signal VN when the switching signal PIN is L, and outputs the voltage VLn as the light intensity modulation signal VN when the switching signal PIN is H.

The light intensity modulator 22A is a device for modulating the intensity of the illumination light to irradiate the sample 1, and includes a light modulation element 22a and a deflection beam splitter 22b as shown in FIG. 13. The light modulation element 22a changes the rotation angle of the polarization plane of the illumination light I1 in accordance with the potential difference between the light intensity modulation signals VP and VN applied from the light intensity control circuit 34. The illumination light I1 modulated by the light modulation element 22a enters the deflection beam splitter 22b, and illumination light I1' having an intensity in accordance with the rotation angle of the polarization plane passes through the deflection beam splitter 22b.

In the embodiment, the controller 40 calculates the linear velocity of the rotary stage 12 at the illumination spot on the sample 1 on the basis of the coordinate detection signals (R, θ coordinates) of the rotary stage 12 and the rectilinear stage 13, and outputs the calculated linear velocity to the data processing circuit 31. The data processing circuit 31 calculates the voltage control signals PHn and PLn according to the linear velocity of the rotary stage 12 during the rise of the rotation speed of the sample 1 (that is, during rotation acceleration). The voltage control signals PHn and PLn to be calculated here are values for setting the intensity of the illumination light I1' to a desired target value, and are output to the light intensity control circuit 34 so that the intensity of the illumination light I1' is adjusted to the desired target value.

It should be noted that the intensity of the illumination light I1 irradiated on the sample 1 via the beam splitter 22B is detected by the light intensity sensor 33, and the detection result LI thereof is output from the light intensity sensor 33 to the data processing circuit 31 in the embodiment. The actually measured value of the intensity of the illumination light adjusted by outputting the voltage control signals PHn and PLn and the switching signal PIN is fed back to the data processing circuit 31. Due to variations in characteristics of the light modulation element 22a caused by environmental conditions such as temperature, the illumination light having an intensity corresponding to the voltage control signals PHn and PLn and the switching signal PIN is not output in some cases. In such a case, the voltage control signals PHn and PLn and the switching signal PIN are adjusted by the data processing circuit 31 so that the difference between the actually measured value to be fed back and the target value becomes small.

Figure 14:
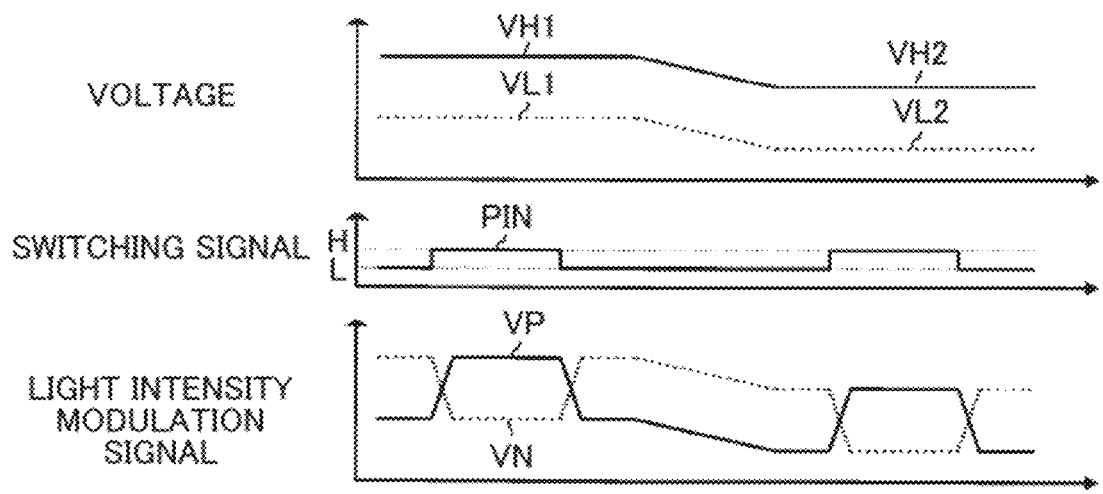
FIG. 14 is an operation explanatory diagram of the light intensity control circuit in the third embodiment of the present invention.

FIG. 14 is an operation explanatory diagram of the light intensity control circuit 34. The switching signal PIN is a binary signal indicating that the potential is L or H. When the switching signal PIN is L, the switching circuit 37 outputs the voltage VLn as the light intensity modulation signal VP, and the switching circuit 38 outputs the voltage VHn as the light intensity modulation signal VN. That is, the light intensity modulation signal VP has the same potential as the voltage VLn, and at the same time, the light intensity modulation signal VN has the same potential as the voltage VHn. When the switching signal PIN is L, a potential difference of VLn-VHn is applied to the light modulation element 22a.

On the contrary, when the switching signal PIN is H, the switching circuit 37 outputs the voltage VHn as the light intensity modulation signal VP, and the switching circuit 38 outputs the voltage VLn as the light intensity modulation signal VN. The light intensity modulation signal VP has the same potential as the voltage VHn, and at the same time, the light intensity modulation signal VN has the same potential as the voltage VLn. When the switching signal PIN is H, a potential difference of VHn-VLn is applied to the light modulation element 22a.

It should be noted that FIG. 14 exemplifies a case where two voltage control signals PH1 and PH2 having different values are prepared as the voltage control signal PHn from the data processing circuit 31. That is, n is 1 or 2. As similar to the above, two voltage control signals PL1 and PL2 having different values are prepared for the voltage control signal PLn. A voltage VH1 or VH2 corresponding to the voltage control signal PH1 or PH2 is generated by the variable voltage generating circuit 35, and a voltage VL1 or VL2 corresponding to the voltage control signal PL1 or PL2 is generated by the variable voltage generating circuit 36. In this case, a voltage having a switching amplitude (|VHn−VLn|) and an offset voltage ((VHn+VLn)/2) is applied to the light modulation element 22a. The rotation angle of the polarization plane of the illumination light I1 by the light modulation element 22a can be finely adjusted in accordance with the number n. Of course, if the voltage control signals PHn and PLn are switched in more multiple stages (three or more stages), the rotation angle of the polarization plane of the illumination light I1 can be more finely adjusted.

The data processing circuit 31 calculates the linear velocity of the current scanning on the sample 1 by the illumination light on the basis of scan information generated by the controller 40, generates the voltage control signals PHn and PLn and the switching signal PIN corresponding to the calculated linear velocity, and outputs them to the light intensity control circuit 34. Accordingly, the intensity of the illumination light irradiated on the sample 1 is adjusted according to the linear velocity. For example, if the linear velocity is slow, the intensity of the illumination light is weakened relative to a case where the linear velocity is fast.

Figure 15:
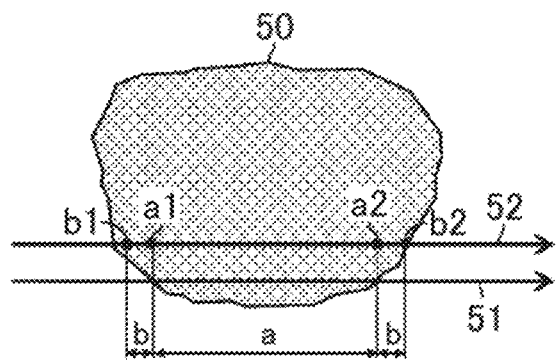
FIG. 15 is a diagram for explaining, in the case where it is determined that there is a foreign matter having a large diameter, control for weakening the intensity of illumination light on the next scanning line of the illumination light on the outer peripheral side thereof in the third embodiment of the present invention.

In addition, it is assumed that the sample 1 is scanned spirally or concentrically and a foreign matter 50 is detected as a defect at, for example, a first scanning locus 51 of the N-th round as shown in FIG. 15. In this case, the data processing circuit 31 measures the size a of the foreign matter 50 along the first scanning locus 51, and determines that the foreign matter 50 is a foreign matter having a large diameter if the size a is larger than a setting value. If the foreign matter having a large diameter is recognized during the scanning in this way, the data processing circuit 31 reduces the intensity of the illumination light irradiated on a region where the presence of the foreign matter 50 is estimated at a second scanning locus 52 of the (N+1)-th round. Specifically, a region having the size a (or a size (a+2b) obtained by adding a predetermined increase size b to both sides thereof) shifted from the region where the foreign matter 50 exists on the first scanning locus 51 to the outer peripheral side of the sample 1 is set as a region where the foreign matter 50 exists on the second scanning locus 52. That is, the region having the size a from a start point a1 to an end point a2 or the region having the size (a+2b) from a start point b1 to an end point b2 on the second scanning locus 52 shown in FIG. 15 is the region where the intensity of the illumination light is reduced. During the scanning of the second scanning locus 52, the data processing circuit 31 adjusts the voltage control signals PHn and PLn and the switching signal PIN to weaken the intensity of the illumination light when the illumination spot of the illumination light I1' on the sample 1 reaches the start point a1 or b1. Thus, the region where the presence of the foreign matter 50 is estimated is scanned by the illumination light with low intensity, and when the illumination spot reaches the end point a2 or b2, the data processing circuit 31 adjusts the voltage control signals PHn and PLn and the switching signal PIN to return the intensity of the illumination light to the original value. Even during the scanning of the second scanning locus 52, the detection of the defect and the determination of the size of the defect are executed as similar to the scanning of the first scanning locus 51, and in the case where a foreign matter having a large diameter is detected, the similar processing is executed on the scanning locus of the (N+3)-th round. This processing is repeatedly executed every round.

Other configurations and operations are similar to the first or second embodiment. In the defect inspection device 100A of the embodiment, since the inspection is performed even during the acceleration/deceleration of the rotation of the sample 1 as similar to the first and second embodiments, the similar effects as in the first and second embodiments can be obtained.

In addition, since the sample 1 is scanned spirally or concentrically from the center O of the sample 1 as described above, the linear velocity decreases in the scanning during acceleration. Since the irradiation amount of the illumination light I1 increases in the central portion of the sample 1 due to the decrease in the linear velocity, it is necessary to suppress the damage caused by the illumination light in the central portion of the sample in some cases. Further, while the defect inspection device 100A can obtain the ability to detect minute defects of tens of nanometers or less with high accuracy due to the improved sensitivity, the irradiation amount of the illumination light per point increases by the amount corresponding to the decrease in the linear velocity in the central portion of the sample 1. In the case where the irradiation amount per point becomes excessive due to the setting of the illumination intensity at that time, for example, when a foreign matter having a large diameter exceeding several hundred nanometers exists near the center, the foreign matter having a large diameter can be destroyed. If the foreign matter having a large diameter is destroyed, there is a possibility that fragments of the foreign matter are diffused on the surface of the sample 1 and the defective region of the sample 1 expands. In the case where such a problem is concerned, a function of limiting the amount of illumination light to be irradiated on the sample 1 per point is required.

Therefore, in the case where a foreign matter having a large diameter is detected in the embodiment, the intensity of the illumination light irradiated on the region where the presence of the foreign matter having a large diameter is estimated is reduced according to the linear velocity as described above. Accordingly, the burnout of the foreign matter having a large diameter and the thermal damage of the sample 1 can be suppressed, and the occurrence of saturation in the photodetector 27 by the high-intensity inspection light 12 reflected by the foreign matter having a large diameter or the like can be suppressed to optimize the exposure.

In addition, the data processing circuit 31 detects variations in characteristics of the light modulation element 22a on the basis of the detection result of the light intensity sensor 33, and adjusts the voltage control signals PHn and PLn and the switching signal PIN in accordance with the variations in characteristics. Accordingly, the deviation of the amount of illumination light irradiated on the sample 1 from the target value can be suppressed for a long time.

MODIFIED EXAMPLE

It should be noted that although the case where the rotation speed N starts to decelerate at the time the setting time t4 comes has been described above, it is also possible to determine whether or not to shift to the scanning during deceleration on the basis of, for example, the fact that the scanning position on the sample has reached a predetermined position. However, since the moving speed, the specified rotation speed, and the specified linear velocity are preliminarily determined also in this case, the arrival at the predetermined scanning position and the coming of the setting time t4 are the same, which means that the coming of the setting time t4 is determined to start to decelerate the rotation speed N.

In addition, in the respective embodiments, the defect inspection devices 100 and 100A have been described as examples in which a program for executing the scanning during acceleration or the scanning during deceleration is mounted and the procedures of FIG. 6 and FIG. 9 are automatically executed. However, even if a defect inspection device that does not mount such a program is used, it is possible to perform the defect inspection method according to the procedures of FIG. 6 and FIG. 9 by, for example, manually operating the inspection device while viewing the speed information and the position information on a monitor.

LIST OF REFERENCE SIGNS 1 sample
12 rotary stage
13 rectilinear stage
20 illumination and detection unit
21 emission optical system
22A light intensity modulator
25 detection optical system
31 data processing circuit
34 light intensity control circuit
40 controller
100 defect inspection device
100A defect inspection device
I1 illumination light
I1' illumination light
I2 inspection light
N rotation speed
N0 specified rotation speed
O center of sample
P1 sample delivery position
P2 scanning start position
PH1, PH2, PHn, PL1, PL2, PLn voltage control signal
t4 setting time
t6 time when sample arrives at sample delivery position

The invention claimed is:

1. A defect inspection device that irradiates a sample moving while rotating with illumination light and inspects a defect of the sample by scanning the sample spirally or concentrically, the device comprising:
   an illumination and detection unit that includes an emission optical system for irradiating the sample with the illumination light and a detection optical system for detecting inspection light scattered or reflected by the sample;
   a rotary stage that allows the sample to rotate;
   a rectilinear stage that allows the rotary stage to move straight; and
   a controller that controls the illumination and detection unit, the rotary stage, and the rectilinear stage,
   wherein a scanning start position where the sample is irradiated with the illumination light to start scanning and a sample delivery position where the movement of the sample to the scanning start position is started are provided on a linear path of the rectilinear stage, and
   wherein when the sample arrives at the scanning start position, the controller starts to irradiate the sample with the illumination light without waiting for the rotation speed of the rotary stage to rise to a specified rotation speed for scanning, and raises the rotation speed of the rotary stage to the specified rotation speed while scanning the sample.

2. The defect inspection device according to claim 1,
   wherein the rotation speed of the rotary stage is started to be lowered from a setting time before a required stop time required to stop the rotary stage by calculating backward from a time when the sample arrives at the sample delivery position.

3. The defect inspection device according to claim 1,
   wherein the rotary stage stops at a time when the sample arrives at the sample delivery position after the scanning of the sample is completed.

4. The defect inspection device according to claim 2,
   wherein the controller starts to lower the rotation speed of the rotary stage while scanning the sample from the setting time to lower a linear velocity of the sample.

5. The defect inspection device according to claim 2,
   wherein the emission optical system is arranged to obliquely irradiate the sample with the illumination light,
   wherein the scanning start position is a position where a center of the sample is irradiated with the illumination light, and
   wherein the controller is configured to feed the rectilinear stage in the direction approaching the emission optical system from the scanning start position and to scan from the center of the sample to an outer edge.

6. The defect inspection device according to claim 2,
   wherein the setting time comes in a state where an angular velocity of the rotary stage is constant.

7. The defect inspection device according to claim 2,
   wherein the setting time comes in a state where a linear velocity of the rotary stage is constant.

8. The defect inspection device according to claim 1,
   wherein a distance between the illumination and detection unit and the sample is 0.5 mm to 5 mm.

9. The defect inspection device according to claim 8,
   wherein a position where the sample is loaded and unloaded by a conveying arm for conveying the sample is the sample delivery position.

10. The defect inspection device according to claim 9,
    wherein a distance between the sample delivery position and the scanning start position is 150 mm to 500 mm.

11. The defect inspection device according to claim 9, comprising:
    a light intensity modulator that modulates the intensity of the illumination light to irradiate the sample;
    a light intensity control circuit that controls the light intensity modulator on the basis of a voltage control signal; and
    a data processing circuit that outputs the voltage control signal for controlling the intensity of the illumination light in accordance with a linear velocity of the rotary stage during the rise of the rotation speed of the sample,
    wherein the controller calculates the linear velocity of the rotary stage at an illumination spot on the sample on the basis of coordinate detection signals of the rotary stage and the rectilinear stage and outputs the linear velocity of the rotary stage to the data processing circuit to adjust the intensity of the illumination light.

12. A defect inspection method in which a sample moved by a rotary rectilinear stage is irradiated with illumination light and a defect of the sample is inspected by scanning the sample spirally or concentrically, wherein the sample is moved from a sample delivery position to a scanning start position by driving the rotary rectilinear stage, wherein when the sample arrives at the scanning start position, the irradiation of the illumination light on the sample is started, and a rotation speed of the rotary rectilinear stage is raised to a specified rotation speed for scanning while scanning the sample, and wherein the rotation speed of the rotary rectilinear stage is started to be lowered from a setting time before a required stop time required to stop the rotary rectilinear stage by calculating backward from the time when the sample arrives at the sample delivery position.

* * * * *